(12) United States Patent
Ozawa

(10) Patent No.: US 7,415,765 B2
(45) Date of Patent: Aug. 26, 2008

(54) FLANGE COUPLING AND MANUFACTURING METHOD FOR THE SAME

(75) Inventor: Kouichi Ozawa, Tokyo (JP)

(73) Assignee: Ohtsuka Co., Ltd. (JP)

(*) Notice: Subject to any disclaimer, the term of this patent is extended or adjusted under 35 U.S.C. 154(b) by 292 days.

(21) Appl. No.: 10/508,571

(22) PCT Filed: Mar. 27, 2002

(86) PCT No.: PCT/JP02/02991

§ 371 (c)(1),
(2), (4) Date: Sep. 20, 2004

(87) PCT Pub. No.: WO03/081115

PCT Pub. Date: Oct. 2, 2003

(65) Prior Publication Data

US 2005/0167977 A1    Aug. 4, 2005

(51) Int. Cl.
  *B21D 51/16* (2006.01)
  *B21D 39/00* (2006.01)
  *F16L 39/00* (2006.01)
  *F16L 5/00* (2006.01)

(52) U.S. Cl. ............ 29/890.149; 29/505; 29/509; 29/510; 29/521; 285/133.11; 285/179; 285/205; 285/382; 285/420

(58) Field of Classification Search ............ 29/890.149, 29/505, 509, 510, 521; 285/208, 179, 205, 285/123.1, 133.11, 382, 368, 123.11, 124.3, 285/124.5, 137.11, 142.1
See application file for complete search history.

(56) References Cited

U.S. PATENT DOCUMENTS

| | | | | |
|---|---|---|---|---|
| 2,963,778 A | * | 12/1960 | Dolby | 29/890.15 |
| 4,286,139 A | * | 8/1981 | Taylor | 219/208 |
| 5,180,005 A | * | 1/1993 | Marsais et al. | 165/178 |
| 5,526,558 A | * | 6/1996 | Caley, Sr. | 29/402.08 |
| 5,593,279 A | * | 1/1997 | Hayashi | 415/213.1 |
| 5,625,948 A |   | 5/1997 | Kuroda et al. | |
| 5,727,304 A | * | 3/1998 | Eybergen | 29/525.04 |
| 5,853,201 A |   | 12/1998 | Izumi et al. | |
| 6,318,765 B1 | * | 11/2001 | Slais et al. | 285/305 |
| 6,328,351 B1 |   | 12/2001 | Kato et al. | |
| 6,331,020 B1 | * | 12/2001 | Brunella | 285/179 |
| 6,890,005 B1 | * | 5/2005 | Chisnell | 285/208 |

FOREIGN PATENT DOCUMENTS

DE    195 12 646 A1    10/1996

(Continued)

*Primary Examiner*—David P. Bryant
*Assistant Examiner*—Alexander P Taousakis
(74) *Attorney, Agent, or Firm*—Lerner, David, Littenberg, Krumholz & Mentlik, LLP

(57) ABSTRACT

An object of the present invention is to provide a flange coupling in which the height of a horizontal portion of an L-shaped pipe is made as small as possible. The present invention provides a flange coupling having a flange formed with an attaching bolt hole and a pipe connection hole and an L-shaped pipe installed in the pipe connection hole, wherein the L-shaped pipe is made of aluminum or aluminum alloy, and a horizontal portion of the L-shaped pipe is molded so that a lower face thereof is at the same level as or at the level close to a plane including the upper surface of the flange.

3 Claims, 4 Drawing Sheets

FOREIGN PATENT DOCUMENTS

| | | |
|---|---|---|
| DE | 199 56 463 A1 | 5/2000 |
| JP | 63-057988 | 3/1988 |
| JP | 2-253088 A | 10/1990 |
| JP | 03-229095 | 10/1991 |
| JP | 6-114454 | 4/1994 |
| JP | 6-80995 U | 11/1994 |
| JP | 9-1247 A | 1/1997 |
| JP | 09-052132 | 2/1997 |
| JP | 2000-218322 A | 8/2000 |
| WO | WO-01/63168 A1 | 8/2001 |

\* cited by examiner ized.com/2023/02/16/2023021604

FLANGE COUPLING AND MANUFACTURING METHOD FOR THE SAME

TECHNICAL FIELD

The present invention relates to a flange coupling and, more particularly, a flange coupling used for automotive air conditioner piping, and a manufacturing method for the same.

BACKGROUND ART

There has been conventionally available a flange coupling in which a pipe 4 is welded to the side face of a flange 3, for example, as shown in FIG. 1. However, the coupling of this type has a drawback of requiring a welding process. Therefore, there can be used a flange coupling in which an L-shaped pipe 4 is installed to the flange 3 and a horizontal portion 5 of the pipe 4 is extended transversely with respect to the flange 3 as shown in FIG. 2.

However, for the flange coupling shown in FIG. 2, the radius of a bent portion must be made inevitably large because of the hardness of pipe used normally, so that the horizontal portion 5 of the pipe 4 has a considerably great height h with respect to the flange 3. Therefore, the flange coupling of this type is unsuitable in the case where it is arranged in an extremely limited space near an engine.

DISCLOSURE OF THE INVENTION

An object of the present invention is to make the height h of a horizontal portion of an L-shaped pipe nearly zero to solve the above problem.

To achieve the above object, the present invention provides a flange coupling having a flange formed with an attaching bolt hole and a pipe connection hole and an L-shaped pipe installed in the pipe connection hole, wherein the L-shaped pipe is made of pure aluminum or aluminum alloy having soft properties or aluminum having elongating properties though being hard, and a horizontal portion of the L-shaped pipe is molded so that a lower face thereof is at the same level as or at the level close to a plane including the upper surface of the flange.

Also, the present invention provides a manufacturing method for a flange coupling, comprising the steps of bending a pipe made of pure aluminum or aluminum alloy having soft properties or aluminum having elongating properties though being hard into an L shape with a radius of curvature that satisfies the condition of $R \leqq 1.0D$ (R: radius, D: pipe diameter); placing the L-shaped pipe in a pipe clamp mold and correcting the pipe end portion thereof to an angle of $R \leqq 0.5D$ or an angle corresponding to this by using a first molding tool moved onto the pipe end portion; fitting a flange on the pipe end portion and expanding the pipe end portion projecting from the flange by using a second molding tool; and fixing the pipe end portion to the flange by pressing the expanded pipe portion against the flange by using a third molding tool.

The aforementioned "pure aluminum or aluminum alloy having soft properties" means a thermally refined O material or an H14 or H24 material of JIS A1000 series, A3000 series, A5000 series, or A6000 series, for example, a material of JIS A1100, A1N00, A3003, or A3203. The "aluminum having elongating properties though being hard" means a material having an elongation not lower than 15%, such as an A6063-T8 material.

According to the present invention, the height of the horizontal portion of the L-shaped pipe could be made as small as possible by the selection of the aforementioned material and by the performance of the aforementioned molding steps.

BEST MODE FOR CARRYING OUT THE INVENTION

Figure 1:
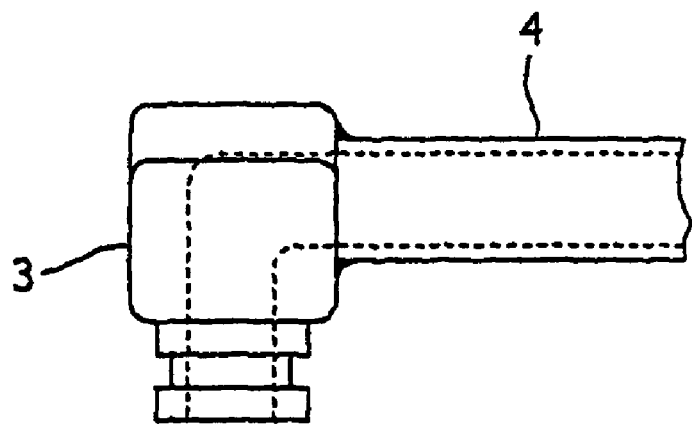
FIG. 1 is a side view of a conventional flange coupling.
Figure 2:
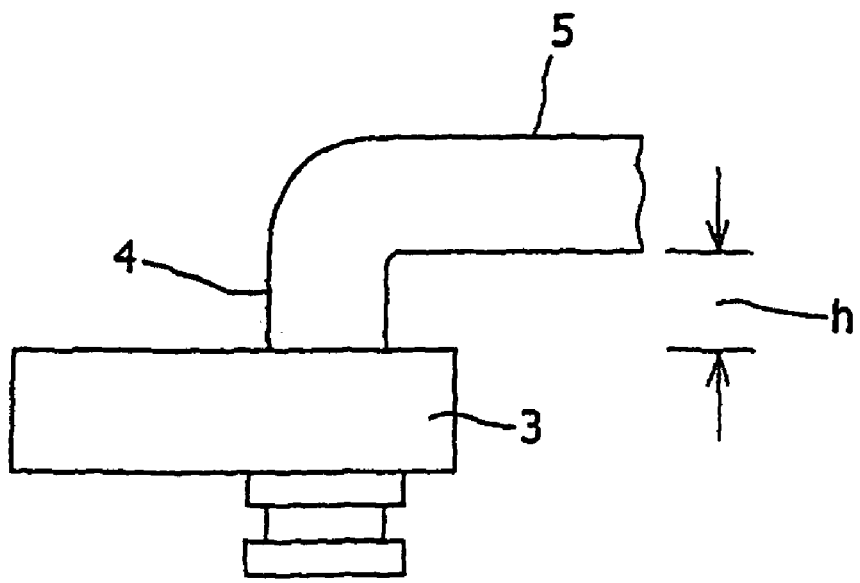
FIG. 2 is a side view of a conventional flange coupling using an L-shaped pipe.

FIGS. 3 to 6 show an embodiment of a flange coupling in accordance with the present invention.

A flange 3 has an attaching bolt hole 1 and a pipe connection hole 2, and the pipe connection hole 2 has many vertical grooves 2' formed in the inside wall thereof. An L-shaped pipe 4 is fitted firmly in the pipe connection hole 2 so as not to turn, and is fixed vertically by a seal boss portion 7. Reference numeral 8 denotes an O-ring groove.

The L-shaped pipe 4 is bent in a horizontal direction just from the upper surface of the flange 3 with a small radius of curvature R, and a horizontal portion 5 thereof has a lower face 6 that is at almost the same level as the upper surface of the flange 3.

Figure 3:
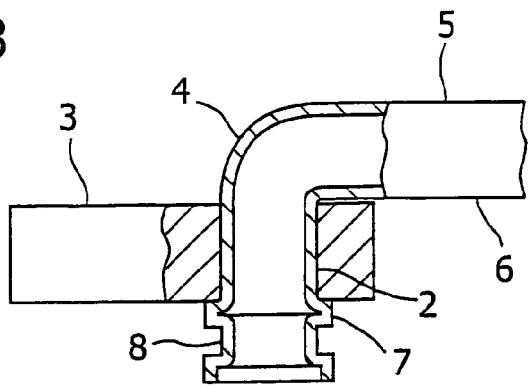
FIG. 3 is a partially broken side view of a flange coupling in accordance with the present invention.
Figure 4:
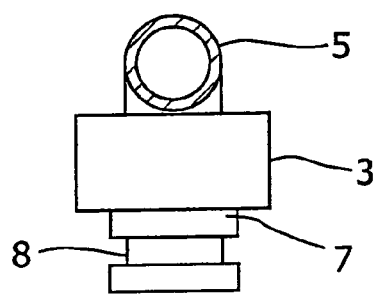
FIG. 4 is an end face view of a flange coupling in accordance with the present invention.
Figure 5:
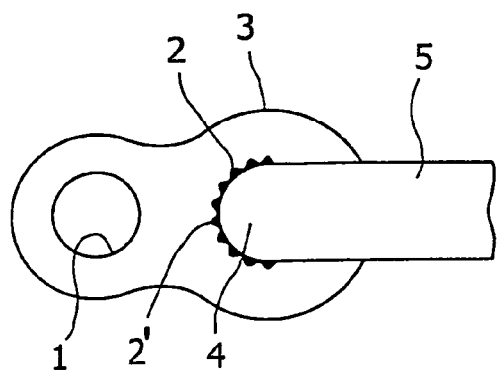
FIG. 5 is a plan view of a flange coupling in accordance with the present invention.
Figure 6:
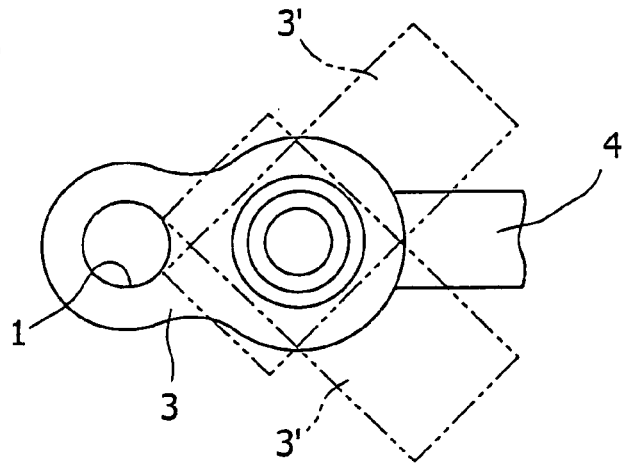
FIG. 6 is a bottom view of a flange coupling in accordance with the present invention.

FIG. 4 is a right end face view of FIG. 3, FIG. 5 is a plan view thereof, and FIG. 6 is a bottom view thereof. In FIG. 6, an imaginary line indicates that the angle of the pipe 4 with respect to the flange 3 can be set freely, and also the flange 3 may be rectangular in the plan view.

The above-described flange coupling is manufactured, for example, through steps shown in FIGS. 7(A) to 7(E).

First, a pipe material 10 specified as JIS A3003-O material (thermally refined O material of A3000 series) is used, and is formed into an L-shaped pipe with a radius of curvature that satisfies the condition of $R=0.6$ to $0.9D$ (R: radius, D: pipe diameter) according to the usual practice.

This pipe 10 is placed in a pipe clamp mold 11, and a first molding tool 13 is lowered so as to cover a pipe end portion 12 of the pipe 10, by which the bend angle of the L-shaped pipe 10 is corrected to an angle of $R=0.5D$ or an angle corresponding to this.

The pipe clamp mold 11 is formed transversely with a hole 11a. The horizontal portion 5 of the L-shaped pipe 10 is supported by the hole 11a, and the other end portion thereof is erected upward. A portion of the pipe clamp mold 11, which corresponds to the outside corner portion of the L-shaped pipe 10, is formed so as to fit the radius of curvature R1 of the outside corner portion of the L-shaped pipe 10. Also, the first molding tool 13 is formed with an inside hole 13a having an inside diameter that is approximately equal to the outside diameter of the L-shaped pipe 10. A portion at the opening of the inside hole 13a, which corresponds to the inside corner portion 13b of the L-shaped pipe 10, is formed so as to fit the radius of curvature R2 of the inside corner portion of the pipe 10. After the correction, the first molding tool 13 is removed.

Next, a flange 14 is fitted on the pipe end portion 12, and a second molding tool 15 is lowered. The pipe 10 is pressed to the outside by a lower end projecting portion 16a of the second molding tool 15, by which the pipe end portion 12 is pressed against the grooves 2' in the pipe connection hole 2 in the flange 14. Thereby, the pipe 10 is fixed in the pipe connection hole 2 so as not to turn. At the same time, the pipe end portion 12 is inserted in an expansion groove 17 in the second molding tool 15, by which the pipe end portion 12 is expanded.

The second molding tool 15 has a projecting portion 16a with a diameter slightly larger than the inside diameter of the pipe 10 and a proximal end portion 16b with a diameter larger than the inside diameter of the pipe 10. The projecting portion 16a projects from a reference plane (contact face with the flange 14) of the second molding tool 15, and the expansion groove 17 is formed around the proximal end portion 16b. Also, a tapered portion 16c in which the diameter decreases toward the distal end is formed between the projecting portion 16a and the proximal end portion 16b. After the molding, the second molding tool 15 is removed.

Next, a third molding tool 18 is lowered. Thereby, the pipe end portion 12 is pressed against the flange 14 by a molding groove 19 and a step portion 20, and thereby a pipe end portion 21 (the seal boss portion 7) with a diameter larger than the diameter of the horizontal portion 5 of the pipe is formed.

The third molding groove 19 has, like the second molding tool 15, a projecting portion 25a with a diameter equal to or slightly smaller than the inside diameter of the pipe 10 and a proximal end portion 25b with a diameter larger than the inside diameter of the pipe 10. The projecting portion 25a projects from a reference plane of the third molding tool 18, and an expansion groove 26 is formed around the proximal end portion 25b. Also, a step portion 26a is provided at the boundary between the projecting portion 25a and the proximal end portion 25b, that is, in a position corresponding to the surface of the flange 14. This step portion 26a is formed on the inside from the reference plane by the plate thickness of the pipe 10. A step is formed in the tapered portion of the pipe 10 by the step portion 26a, and this step comes into contact with the surface of the flange 3.

Next, a groove 22 for fitting an O-ring is formed in the end portion 21 of the pipe 10, thereby completing the product.

Figure 7A:
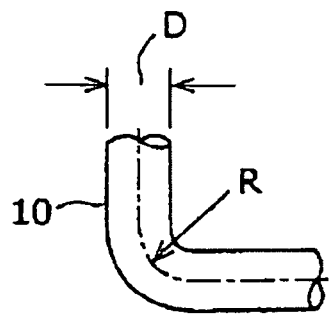
FIGS. 7(A) to 7(E) are views showing a manufacturing process for the flange coupling shown in FIGS. 3 to 6.
Figure 7B:
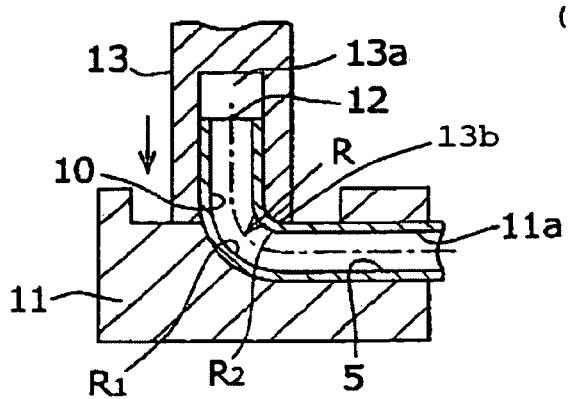
Figure 7C:
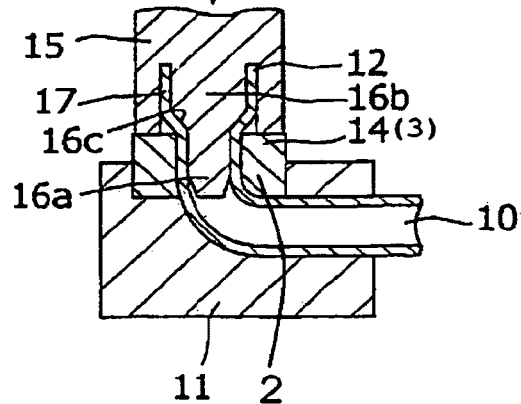
Figure 7D:
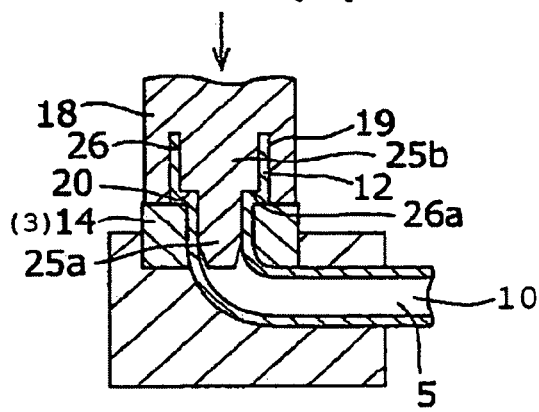
Figure 7E:
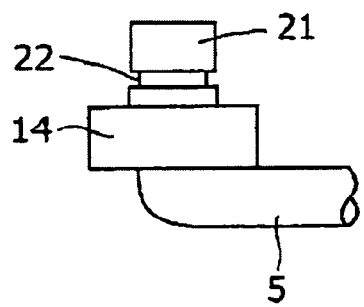

Although the first, second, and third molding tools are used in the above-described embodiment, the molding shown in FIG. 7(C) can be performed at a stroke using only the second molding tool 15 by omitting the first molding tool 13. This is because the gist of the present invention is that an L-shaped pipe with a small radius of curvature R is formed, the L-shaped pipe is fixed non-rotatably to a flange, an expanded portion is formed in the pipe end portion, an O-ring groove is formed therein, and a height h of a horizontal portion of the L-shaped pipe is made as small as possible.

Specifically, a pipe made of aluminum or aluminum alloy is bent into an L shape with a radius of curvature that satisfies the condition of $R \leq 1.0D$ (R: radius, D: pipe diameter), the L-shaped pipe is placed in the pipe clamp mold, the flange is fitted on the pipe end portion of the pipe, and the pipe end portion is expanded by the second molding tool 15. Then, the bend angle of the L-shaped pipe is corrected to an angle of $R \leq 0.5D$ or an angle corresponding to this by the flange 14, and the expanded portion is pressed against the flange, by which the pipe end portion is fixed to the flange.

Figure 8:
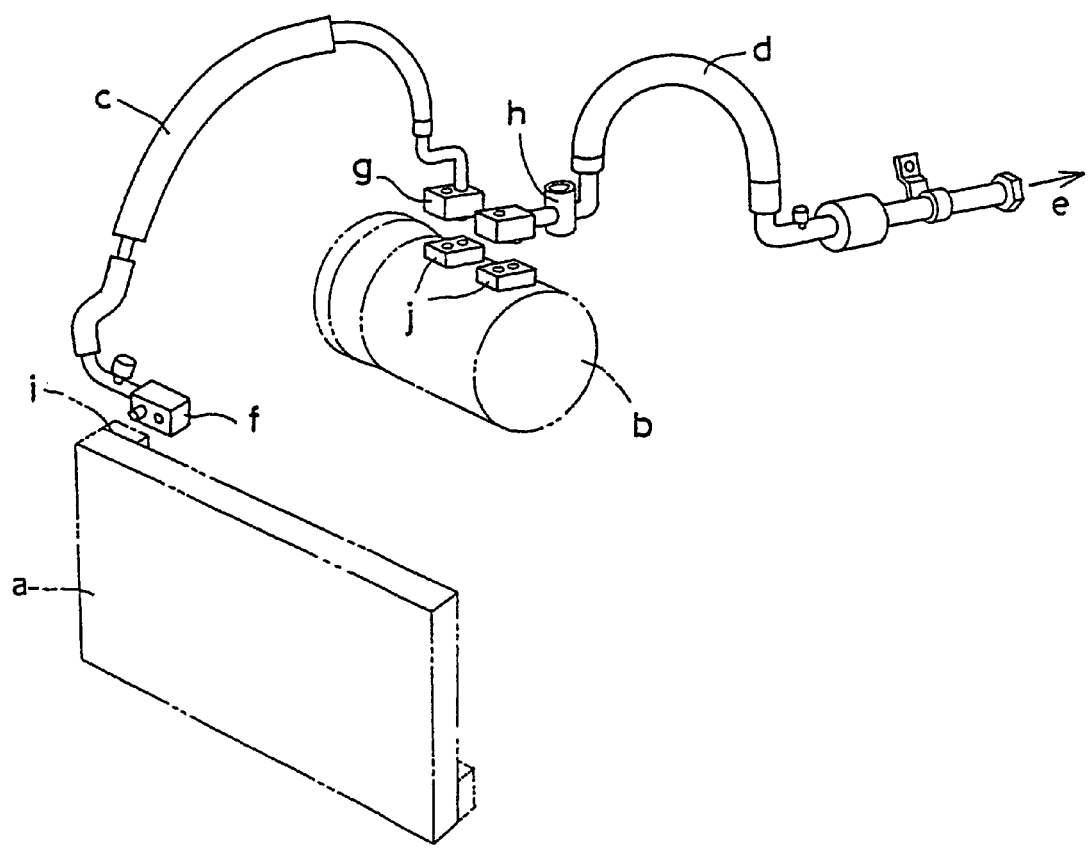
FIG. 8 is a schematic view showing the state of an automotive air conditioner piping to which a flange coupling in accordance with the present invention is applied.

The above-described flange coupling is used, for example, as shown in FIG. 8.

In FIG. 8, reference character a denotes a condenser arranged in front of a radiator, not shown, and b denotes a compressor connected to the condenser a via a hose c. The compressor b is connected to a cooling unit e, not shown, via a hose d. Reference characters f, g and h denote flange couplings installed at the ends of the hoses c and d, and these flange couplings f, g and h are installed on a mount i provided on the condenser a and mounts j, j provided on the compressor b. The present invention is applied to the above-described flange couplings.

Figure 9:
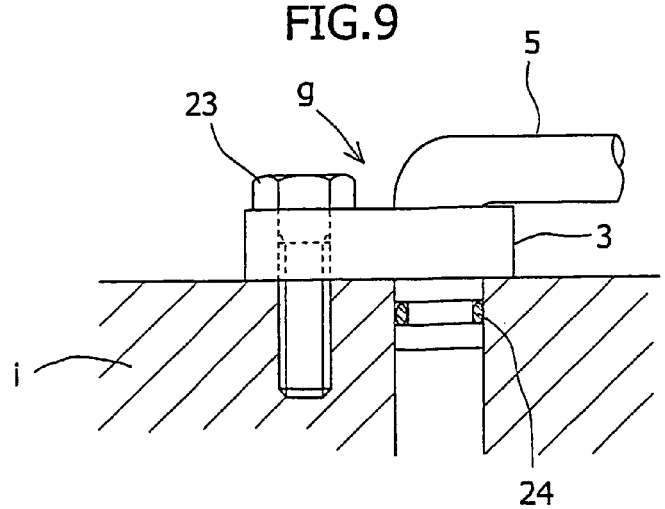
FIG. 9 is a view showing a state in which a flange coupling in accordance with the present invention is mounted to a compressor mount.

FIG. 9 enlargedly shows a state in which the flange coupling g is installed on the mount j via an O-ring 24 by using a bolt 23.

According to the present invention, there can be provided a flange coupling in which an L-shaped pipe is installed in a very low position with respect to a flange and a manufacturing method for the same. When this flange coupling is used for automotive air conditioner piping, a space near an engine can be utilized effectively, so that the quality of automobile design can be improved.

The invention claimed is:

1. A manufacturing method for a flange coupling, comprising the steps of:
    bending a pipe made of aluminum or aluminum alloy into an L shape with a radius of curvature that satisfies the condition of $R \leq 1.0 D$ (R: radius of pipe median line, D: pipe diameter), said aluminum or aluminum alloy being at least one kind selected from a group of pure aluminum or aluminum alloy having soft properties and aluminum having elongating properties through being hard;
    placing the resultant L-shaped pipe in a pipe clamp mold and correcting the pipe end portion thereof to an angle of $R \leq 0.5 D$ by pressing the vicinity of a pipe end portion with the use of a first molding tool which has a concave portion fitting the pipe end portion of said L-shaped pipe and has a lower end portion;
    fitting a pipe connection hole of a flange provided with an attaching bolt hole and the pipe connection hole, on said pipe end portion, and pressing said pipe against the inside wall of said pipe connection hole and expanding the pipe end portion projecting from said flange, with the use of a second molding tool which has a lower end portion with an outside diameter slightly larger than the inside diameter of the said pipe and has an expansion groove; and
    fitting said flange to the pipe end portion of the L-shaped pipe by pressing the expanded pipe end portion against said flange with the use of a third molding tool which has a molding groove and a step portion.

2. The manufacturing method for a flange coupling according to claim 1, wherein said method comprising a step of forming a groove for fitting an O-ring in said pipe end portion, said step being performed after the step of fixing said pipe end portion to said flange.

3. The manufacturing method for a flange coupling according to claim 1 or 2, wherein said aluminum or aluminum alloy is at least one kind selected from a group of pure aluminum or aluminum alloy having soft properties and aluminum having elongating properties though being hard.

* * * * *